US007489689B2

(12) United States Patent
Ma et al.

(10) Patent No.: US 7,489,689 B2
(45) Date of Patent: Feb. 10, 2009

(54) METHOD, SYSTEM AND APPARATUS FOR SCHEDULING A LARGE POOL OF RESOURCES

(75) Inventors: Sha Ma, San Jose, CA (US); William Lynch, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 651 days.

(21) Appl. No.: 11/260,587

(22) Filed: Oct. 26, 2005

(65) Prior Publication Data

US 2007/0091803 A1    Apr. 26, 2007

(51) Int. Cl.
H04L 12/56    (2006.01)
(52) U.S. Cl. .................... 370/395.4; 370/256
(58) Field of Classification Search ......... 370/255–256, 370/395.4–42
See application file for complete search history.

(56) References Cited

U.S. PATENT DOCUMENTS

| 5,781,531 | A * | 7/1998 | Charny .................. 370/232 |
|---|---|---|---|
| 7,293,024 | B2 * | 11/2007 | Bayliss et al. .................. 707/10 |
| 2004/0008634 | A1 * | 1/2004 | Rangarajan et al. ......... 370/256 |
| 2004/0249803 | A1 * | 12/2004 | Vankatachary et al. ......... 707/3 |
| 2004/0267958 | A1 * | 12/2004 | Reed et al. .................. 709/238 |
| 2005/0243740 | A1 * | 11/2005 | Chen et al. .................. 370/256 |
| 2006/0095444 | A1 * | 5/2006 | Nadj et al. .................. 707/100 |

OTHER PUBLICATIONS

Valente, P., Extract GPS Simulation with Logarithmic Complexity, and its Application to an Optimally Fair Scheduler. SIGCOMM'04, Aug.-Sep. 2004, Portland OR, copyright 2004 [Valente continued] ACM 1-58113-862-8/04/0008.
Neubauer, P., B-Trees: Balanced Tree Data Structures, copyright 1999 Peter Neubauer, downloaded from the Internet: <http:www.bluewhite.org/btree/>.

* cited by examiner

*Primary Examiner*—Chi H. Pham
*Assistant Examiner*—Thai D. Hoang
(74) *Attorney, Agent, or Firm*—Charles E. Krueger (57) ABSTRACT

A system and method for scheduling resources utilizes a data structure that supports quick sorting to find a highest priority eligibility key. The data structure provides for guaranteed storage efficiency, supports insertion and deletion, and assures that the worst-case operation to maintain its properties after assertion is O(log N) where N is the number of active keys.

32 Claims, 4 Drawing Sheets

| Number of Levels | Minimum keys | Number of nodes | Minimum occupancy |
|---|---|---|---|
| 2 | 8 | 3 | 33% |
| 3 | 32 | 11 | 36% |
| 4 | 128 | 43 | 37% |

FIG. 1

B-Heap Siblings

METHOD, SYSTEM AND APPARATUS FOR SCHEDULING A LARGE POOL OF RESOURCES

BACKGROUND OF THE INVENTION

A common problem in many systems is scheduling resources for servicing or some other operation. Generally, scheduling is based on some priority scheme where the resources have been assigned a priority based on criteria relevant to the operation of the particular system.

In routers, often a large pool of resources needs to be scheduled for some operation. For example, in traffic managers the pool consists of many traffic classes each having a time stamp. These traffic classes are scheduled for service (sending a packet) by sorting their time stamps, e.g., the traffic class with the smallest time stamp is scheduled for service.

Another example is aging of a flow in a flow table. Each flow has a last access time label and the flow that was least recently accessed is scheduled to be removed from the table.

Yet another example is a cache replacement algorithm. A cacheable resource is given a usage frequency count where the most frequently used resource is scheduled to be loaded into cache while the least frequently used resource in the cache is scheduled to be replaced.

These are all problems that can be abstracted as such: a dynamic, numeric key is given to each resource to indicate eligibility or priority, and operations are scheduled based on searching for the most eligible key. Usually this can be done with a heap data structure if the size of the pool remains constant. When the size of the pool changes dynamically and dramatically, a classical heap will require serial tree walks to maintain O(log N) maximum depth, limiting its performance.

The challenges in the field of resource scheduling continue to increase with demands for more and better techniques having greater performance and storage efficiency. Therefore, a need has arisen for a new system and method for providing a resource scheduler with guaranteed high performance and low storage requirements.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

In the following, the term "sorting" refers specifically to the function of finding the minimum key in a finite collection of keys. Sorting is a special case of "search". A typical data structure that supports sorting is a heap. A heap is a data structure in the form of a complete binary tree with the property that the parent node always has a higher priority than its children.

The term "search" refers to the function of, given an arbitrary key value, finding its location in a finite collection of keys. Efficient searching requires the key collection be ordered. A typical data structure that supports search is a binary search tree (B-Tree).

A first embodiment of the invention will be described in the context of a job list attached to a node in a two-key scheduling tree that consists of key_2 values from a list of traffic classes. These traffic classes all have the same key_1 value (the multi-precision version) but they can have different key_2 values. For example, these traffic classes may each have a finish time based on the size of the next backlogged packet in the class. The job list must support quick sorting to find the smallest key_2 value. A description of a two-key scheduling tree is described in co-pending application METHOD AND APPARATUS FOR 2-KEY SCHEDULER IMPLEMENTATION, filed 11/259,962 which is hereby incorporated by reference for all purposes.

This problem is akin to the problem a sorting tree solves, so that a heap could be used to solve the problem. The heap is very scalable, and can be traversed fast with parallel memory accesses. However, in this case, the job list cannot remain static because keys are constantly being inserted and deleted as packets are received and transmitted.

Consider a 2-key scheduling tree that has C active nodes in a level, and P number of traffic classes that are mapped to this level. A static job list would need to have a size of P because in the worst case all P traffic classes may have similar key_1 values. However a job list is also needed for each node, so the total storage required would be equal to C*P, which in a scheduler with many traffic classes may not scale well.

What is needed is a dynamic heap that grows as jobs are added to the list and shrinks as jobs are serviced and removed. The data structure must meet the following requirements:
1. The storage efficiency is guaranteed to be above a certain percentage with no pathological cases;
2. Random key insertion is supported;
3. Sort and deletion is supported;
4. The worst-case operation to maintain the property of the tree after insertion and deletion is O(log N), where N is the number of active keys (as opposed to the worst-case number of keys);
5. M-degree tree structure is possible where M>2;
6. Traversing the tree does not require serial memory accesses.

Item 4 has a subtle detail that is of practical importance. Most of the time jobs are distributed among all nodes in a level of the search tree. This makes the average case size of any particular job list smaller than the worst case. If the data structure runs faster, consumes less memory bandwidth and/or computing power in the average case than it does in the worst case, then the data structure is preferred if the design is flexible enough to take advantage of it.

A first embodiment will now be described in the form of a data structure termed a B-Heap. The B-Heap is a dynamic heap that has similar storage efficiency to a classical B-Tree. This allows a B-Heap to always maintain 50% storage efficiency at the leaf level regardless of how large or small the job list is. However the B-Heap can be traversed very fast which gives it the performance equivalent to a static heap.

A tree structure is maintained in order to sort these leaf nodes in O(log N) operations, where N is the number of leaf nodes. Since the number of leaf nodes is guaranteed to be ~2× the number of active jobs, the operation complexity is $O(\log_2 n)$ where n is the number of active jobs. This satisfies all six listed requirements. While a B-Tree has keys populating both internal nodes and leaf nodes, only keys to leaf nodes are populated in a B-Heap.

A B-Heap has nodes structured into a tree; each node can hold up to m keys so the degree of the tree is m. A B-Heap has the following properties:

1. Only leaf nodes hold unique keys (jobs).
2. The most eligible key (for the rest of the description, most eligible translates to smallest, though in real application this can be any deterministic criteria based on the numeric values of the keys) in a node is copied to the parent node; a parent node holds a copy of the best key from each of its descendent nodes; the smallest best key in a parent node is copied to the grandparent; this is repeated until a copy of the best key in the entire tree is propagated to the top.
3. Only one node at the leaf level is 'open' at any time; new keys can only be inserted into an open node; There is an insertion pointer for each B-Heap to help locate the node into which to add a new job. The leaf node identified by this pointer is the sole open leaf node.
4. All other leaf level nodes are 'closed'; closed nodes cannot have new jobs inserted into them.
5. A leaf node must hold at least m/2 keys.
6. At an internal (i.e., non-leaf, non-root) level of the tree, only one node is 'open' at any time; when a new node is added into the level immediately below, it must be added as a direct descendent of the open node; the open leaf node has a set of pointers identifying the sole open node at each internal level; internal open nodes are found out at the time a new job is inserted into the open leaf node.
7. All other internal nodes in that level are 'closed'; closed nodes cannot have new descendents added to them.
8. An internal node must have at least m/2 direct descendents.
9. The root level has exactly one node. It has at least 2 direct descendents unless it is the sole node in the B-Heap.

The storage efficiency of a B-Heap will now be evaluated:

If the tree has 1 level, it can contain 1 to m keys. This tree is trivial.

If the tree has 2 levels, root and leaf, it must have at least 2 leaf nodes, otherwise property 9 is violated. Each leaf node has at least m/2 keys. The minimum storage occupancy of a minimum 2-level tree is m/3m=33% since at least 3 nodes are allocated: 1 root, 2 leaves.

If the tree has at least 3 levels, there are at least 2 non-leaf, non-root nodes. This means there are at least m leaf nodes, or at least m2/2 keys at the leaf level. Occupancy is therefore at least $(m2/2)/[m+2m+m2]=m/2(3+m)$.

Figure 1:
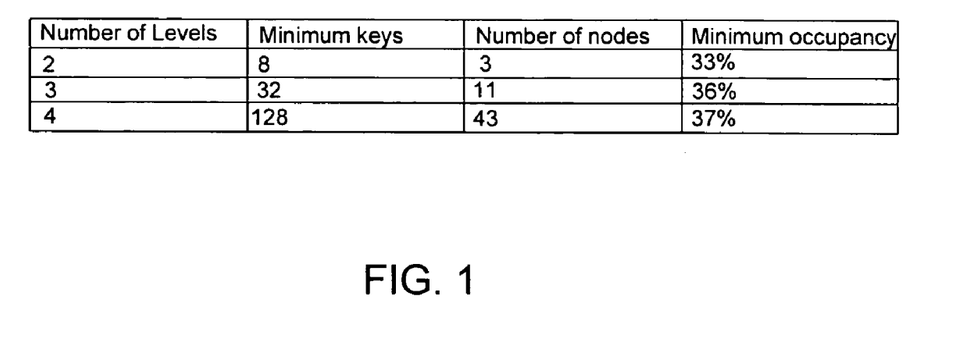
FIG. 1 is a table depicting sample worst-case occupancies of a preferred embodiment.

It can be induced that when the depth of the tree grows the minimum occupancy approaches $(m/2-1)/m$. This provides a good worst-case bound of 50% for storage efficiency in a large heap. FIG. 1 depicts a table of some sample worst-case occupancies assuming a degree of 8.

The process of insertion of a new key into the B-Heap will now be described. When a new key is inserted, it is inserted only to the current open leaf node. If the leaf node becomes full it is split into two nodes. Memory for a new node is allocated and half of the keys in the original node are moved to the new node. The newly added node is immediately closed while the original node, now half empty, remains open.

The new node is attached to the open node at the parent level. If the parent level open node is full, it is split in the same way. This procedure recurs until the root is reached. If the root level node becomes full, it is split into two nodes, each holding half of the descendants. In addition, a new root level node is added to the tree, and made parent to the two nodes at the original root level, which are now demoted to non-root status.

This is the only mechanism by which a B-Heap can grow in depth. When a node is inserted, the open node it is inserted into is re-sorted and the best result is copied to the next level. This recurs until the root is reached. When a node is split, each resulting node produces a key_2 to propagate to the common parent and the rest of the heap operations remain the same. After insertion, all of the 9 properties are still met and so the result is still a B-Heap. The insertion requires an operation at each level of the tree, so the complexity is log N.

Figure 2:
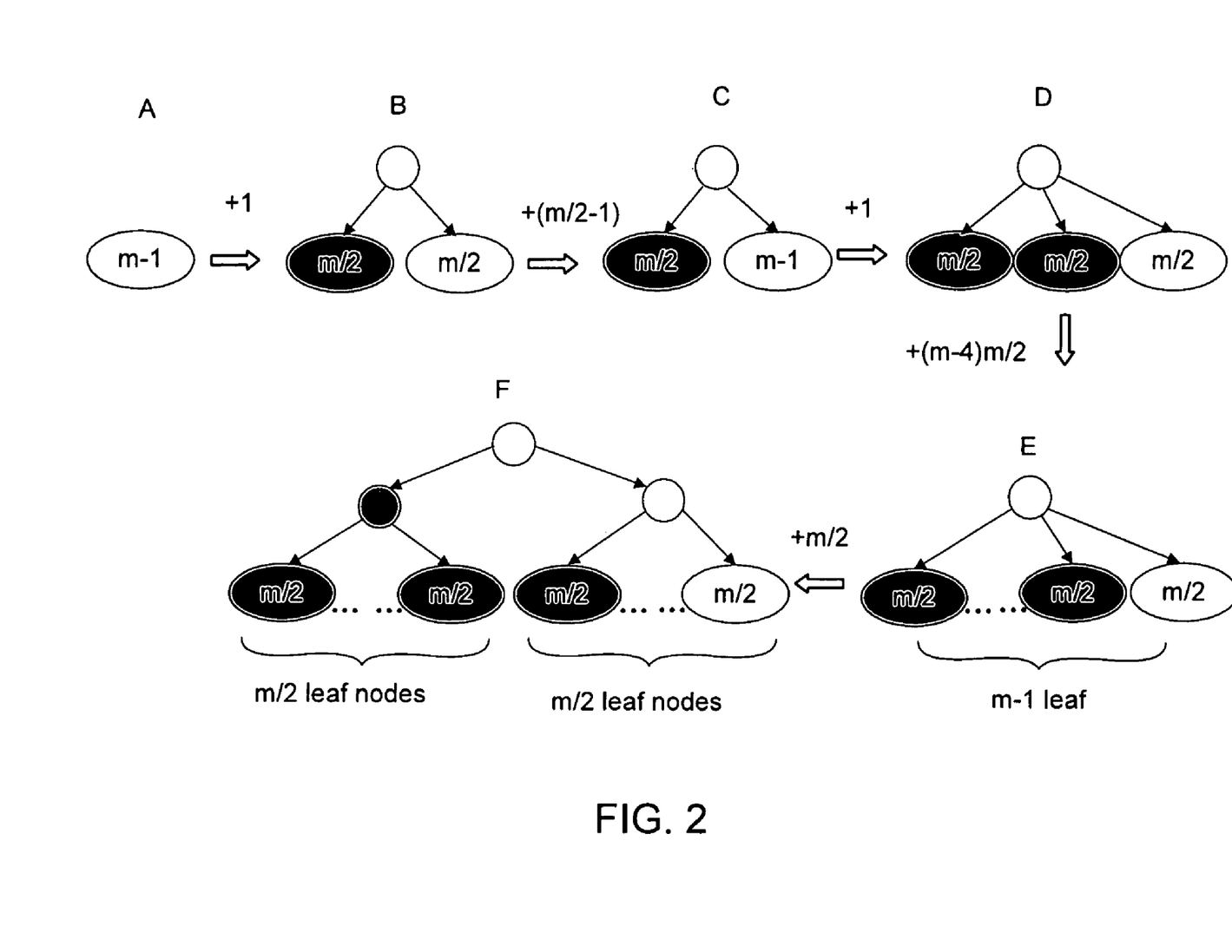
FIG. 2 is a schematic diagram depicting an exemplary insertion operation for a preferred embodiment.

An example of tree growth will now be described with reference to FIG. 2. In FIG. 2 the closed nodes are shaded while the open nodes (leaf as well as their ancestor nodes) are clear. The number of keys held in a leaf node is shown explicitly. The resulting B-Heap structures are labeled A-F.

In FIG. 2, B-Heap A depicts the tree with m-1 keys, which fit into a single node which is both the root and leaf and is open. When another key is added this node is split into two leaf nodes, each holding m/2 keys to form data structure B. One of the nodes is closed and the other remains open. Because there are now two leaf nodes, B-Heap C has a new root node added which is made the parent of both leaf nodes. The tree grows by one level. The heap processing requires that the two leaf nodes are each sorted, and each copies its winner key to the new root node.

More keys can be inserted into the open leaf node of B-Heap B until it becomes full (holding m keys) to form data structure C. At that point the open node is split into two nodes, each holding m/2 keys to form B-Heap D. Again, one of the resulting nodes is closed while the other remains open. The root level node now has three direct descendents instead of two.

Each time a new key is inserted, the open node is resorted and the winner key is copied to the root node, replacing the previous winner from the open node. When the open node is split, each resulting leaf node is sorted and both winner keys are copied to the root node, so afterwards the root node holds three keys, one from each descendent.

More keys can be inserted. Each m/2 keys inserted will cause the then open node to be split, and therefore the root node will add one direct descendent. Since the root level node already has three direct descendents, after further (m-4)*(m/2) key insertions it will end up with m-1 direct descendents, one of which is open and holds m/2 keys to form B-Heap E.

When m/2 more keys are inserted, the then open node is split, which results in the root level node having m direct descendents, thus the root level node is full. At this point, the root level node itself is split into two nodes, each inheriting m/2 of the m leaf nodes as its direct descendents to form B-Heap F. One of the two resulting nodes is closed while the other is open where, in this case, the parent of the open leaf node is the one that remains open. A new root level node is added which is made the parent of the two second level nodes. The tree grows by another level.

Each resulting second level node is sorted and the winner key is copied to the new root node, so the root node holds two keys, one from each direct descendent.

To summarize, in this embodiment, when a key is inserted, the open node it is inserted into is re-sorted and the best result is copied to the next level. This recurs until the root is reached. The keys in root node are sorted to determine the winning key for the entire B-Heap data structure. When a node is split, each resulting node produces a best key to propagate to the common parent and the rest of the heap operations remain the same.

After insertion, all of the 9 properties are still met and so the result is still a B-Heap. The insertion requires an operation at each level of the tree, so the complexity is log N.

Because there is only one open node in each level of the tree, these nodes can be identified all at once and fetched in parallel. This satisfies requirement 6. (In the worst case when each level is split the number of write operations may double).

The operation of deleting a key from the B-Heap will now be described. Deleting a key from the B-Heap is slightly more complicated than insertion because the smallest key may be located in any arbitrary leaf node.

In order to preserve all the properties of B-Heap after a deletion an additional operation may be needed so that the affected node does not end up with less than m/2 keys. This is accomplished by either merging it with another node, or balancing it against another node when necessary. To make it simple, in this embodiment, each node is assigned a unique sibling as the merge/balance partner.

Figure 3:
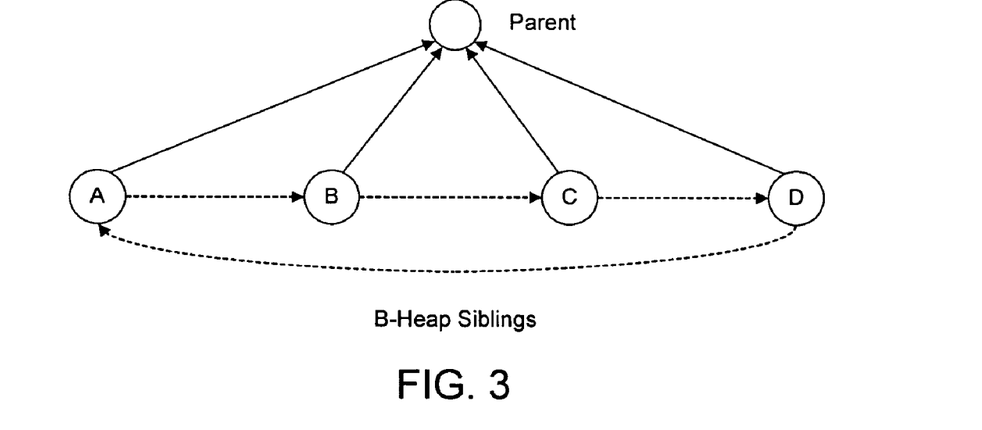
FIG. 3 is a schematic diagram depicting linking of sibling nodes to establish merge/balance partners.

First the tree is augmented by making a closed-loop linked list for each sibling group, as depicted in FIG. 3.

This linked list is formed as nodes are added by splitting nodes. Thus, if A is the original node, and B is created by splitting A, the link from A to B (and from B back to A) is formed at the time of split. When B is split to create C, C inherits B's next pointer (to A) and B's next pointer is modified to point to C, etc. The merge/balance partner of a node is designated to be the next node in the linked list. Therefore; A's partner is B; B's partner is C; C's partner is D; and D's partner is A.

When a key is deleted there are 3 distinct scenarios:
1. After deletion, the leaf node still holds at least m/2 keys. In this case the usual heap resort is performed from leaf to root, and nothing else is done. The resulting tree is still a B-Heap.
2. After deletion, the leaf node holds (m/2−1) keys (it cannot be less as prior to deletion the node holds at least m/2 keys). The partner node holds more than m/2 keys. In this case the node is rebalanced by moving at least one key over from its partner, which results in both nodes satisfying property 5. Both nodes are resorted, and subsequently the (common) parent node is sorted.
3. After deletion, the leaf node holds (m/2−1) keys (it cannot be less as prior to deletion the node holds at least m/2 keys). The partner node holds exactly m/2 keys. In this case the two nodes are merged, and subsequently the partner node is removed from the tree and its storage de-allocated. The resulting node holds (m−1) keys; if either node was open prior to merge, the resulting node is open; otherwise the resulting node is closed. The next pointer in the resulting node is inherited from the partner node. The resulting node is sorted, and then the parent node is sorted.

In the last scenario, a leaf node is removed from the tree. This can have a ripple effect at the parent level. If the parent node started with m/2 descendents, now it is in violation of property 8 since it loses a descendant. A balance/merge operation is needed for the parent node. If the result is a merge, it may affect the grandparent. In the worst case, a merge is required at each level of the B-Heap from leaf to one level below root.

At the root level if there are only two direct descendents and one of them is merged, the root node is removed and the only surviving descendent is promoted to root status. This is the only method for the B-Heap to decrease in depth.

Figure 4:
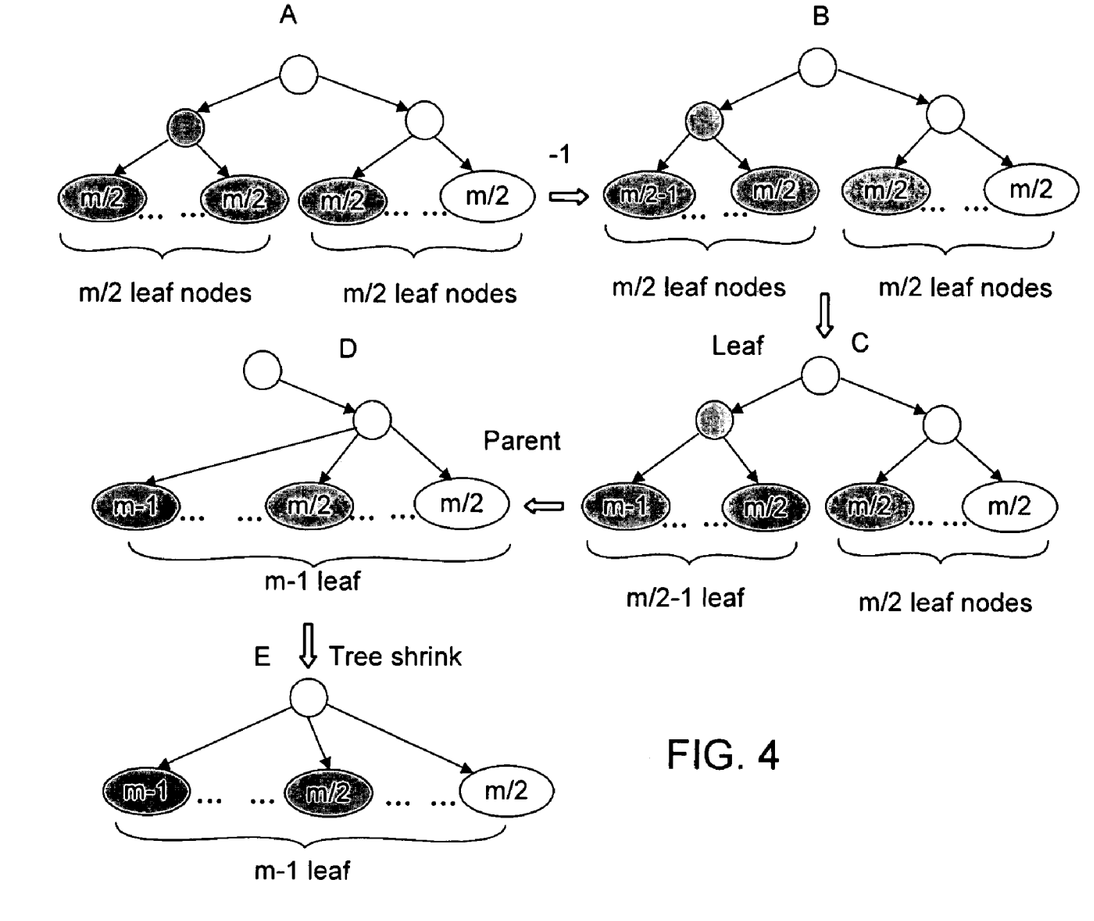
FIG. 4 is a schematic diagram depicting an exemplary deletion operation in preferred embodiment.

An example of key deletion will now be described with reference to FIG. 4. In FIG. 4 the closed nodes are shaded while the open nodes (leaf as well as their ancestor nodes) are clear. The number of keys held in a leaf node is shown explicitly. The resulting B-Heap structures are labeled A-E.

B-Heap A depicts a three level tree having a root level, an internal level, and a leaf level. The nodes at the internal level each have m/2 dependant leaf nodes. In this example, when a key is removed from one of the leaf nodes (in this case the left-most leaf node), the resulting node in data structure B has less than m/2 keys and must be merged or balanced because of property 5. If its merge/balance partner has more than m/2 keys it must be balanced, otherwise it must be merged. Eventually, the number of keys in the merge/balance partner may be reduced to m/2 so that the nodes must be merged to form B-Heap C.

In B-Heap C the left most node of the internal level now has only (m/2−1) descendants so that it only holds (m/2−1) keys which violates property 5. Accordingly, the two nodes of the internal level are merged to form B-heap D and storage is de-allocated. Since one of the nodes was open before the merge the resulting node is open. The root node now has only one descendent which violates property 9 and is therefore removed. The resulting B-Heap E has only two levels so that the original B-Heap A has decreased in depth.

All of the nodes from leaf to root are identified at the beginning of tree traversal, therefore their merge/balance partners can also be identified. This ensures that all memory accesses can be done in parallel.

Fetching partner nodes in anticipation of merge or balance adds to bandwidth usage, but an embodiment of the data structure can be further optimized so that only partner nodes are fetched when a merge or balance is actually required. Considering that most of the time the partner nodes are not needed, the saving may be worthwhile. Notice that a higher level node only needs to be balanced or merged if its descendant merged. The problem is therefore to find out how many levels, starting from the leaf, will be merged when the key at the top of the tree is deleted.

This resembles the carry ripple problem in a multi-bit so that the algorithm is aptly named merge-ripple.
1. For each leaf node, a bit $C_0$ is added, which indicates if the node needs to be merge/balanced with its partner if a key is deleted from it: $C_0$=(node has>m/2 keys)? 0:1
2. At the immediate parent of a leaf node, a bit P1 is added for each descendant. Let P1[j] be the bit for the jth key, and $P_1$[j+1] be the bit for its partner. The P bit indicates if an immediate descendant is a merge candidate. P1[j] =(direct descendant[j] has>m/2 keys)? $0{:}1^2$
3. At the immediate parent of a leaf node, a field $C_1$ is added for each descendant. $C_1$[j] indicates if the jth leaf node will merge with its partner if key[j] is deleted, this is only true if the jth leaf node needs merge/balance, and its partner is a merge candidate (else they balance with each other and the operation terminates at the leaf level), $C_1$[j]=$C_0$[j] & $P_1$[j+1]
4. At the grandparent level, a bit $P_2$ is added for each descendant which has similar meaning as $P_1$ in the parent level, $P_2$[j]=(direct descendant[j] has>m/2 keys)? 0:1
5. At the grandparent level, a field $C_2$ is added for each descendant. $C_2$[j] indicates how many levels below will be merged if key[j] is deleted, i.e., $C_2$[j]=0 if nothing is merged; $C_2[j]=1$ if leaf is merged but parent is not; $C_2[j]=2$ if both leaf and parent are merged $C_2[j]=C_1[j]+C_1[j]$ & $P_2[j+1]$ 6. At the next level, $P_3$ and $C_3$ are defined similarly to $P_2$ and $C_2$, that is, $C_3[j]=C_2[j]+(C_2[j]==2)\&P_3[j+1]$ This can be generalized into $C_k[j]=C_{k-1}[j]+(C_{k-1}[j]==k-1)\&P_k[j+1]$.

The C field that accompanies a key at the root level indicates how many levels of merge will occur (starting from the leaf) when this key is deleted.

If C is 0 no partner nodes are fetched;

If C>0 the partners of the lowest C level nodes are fetched for merge plus 1 more for potentially required balancing.

The cost of this enhancement is $(1+\log_2 k)$ bits per key/pointer stored. For a tree up to 7 levels that is 4 extra bits.

The B-Heap data structure supports dynamic storage allocation and fast sorting with very little additional information added to a simple heap.

Embodiments of a new data structure, B-Heap, have been described that is useful in to help solve the common problems described in the Background in such different areas as routing, cache replacement algorithms, aging a flow in. a flow table, etc. This data structure has similar efficiency characteristics of a B-Tree but is both simpler and faster because it does not have serial tree walk operations. The advantage over B-Tree is achieved by exploiting the difference between sorting (easier) and search (harder). The B-Heap can be augmented with a linked list to make it easier to maintain the tree post deletion. Merge-ripple eliminates any memory access waste by adding a few bits.

In this embodiment, the inserting and deleting of keys, the sorting of keys, and the merging, deleting, balancing, and adding of nodes may performed by program code executed by a digital processing system. As is known in the art, some or all of the processing can be implemented in hard-wired logic embodied in, for example, an ASIC (Application Specific Integrated Circuit) or FPLA (Field Programmable Logic Array).

Figure 5:
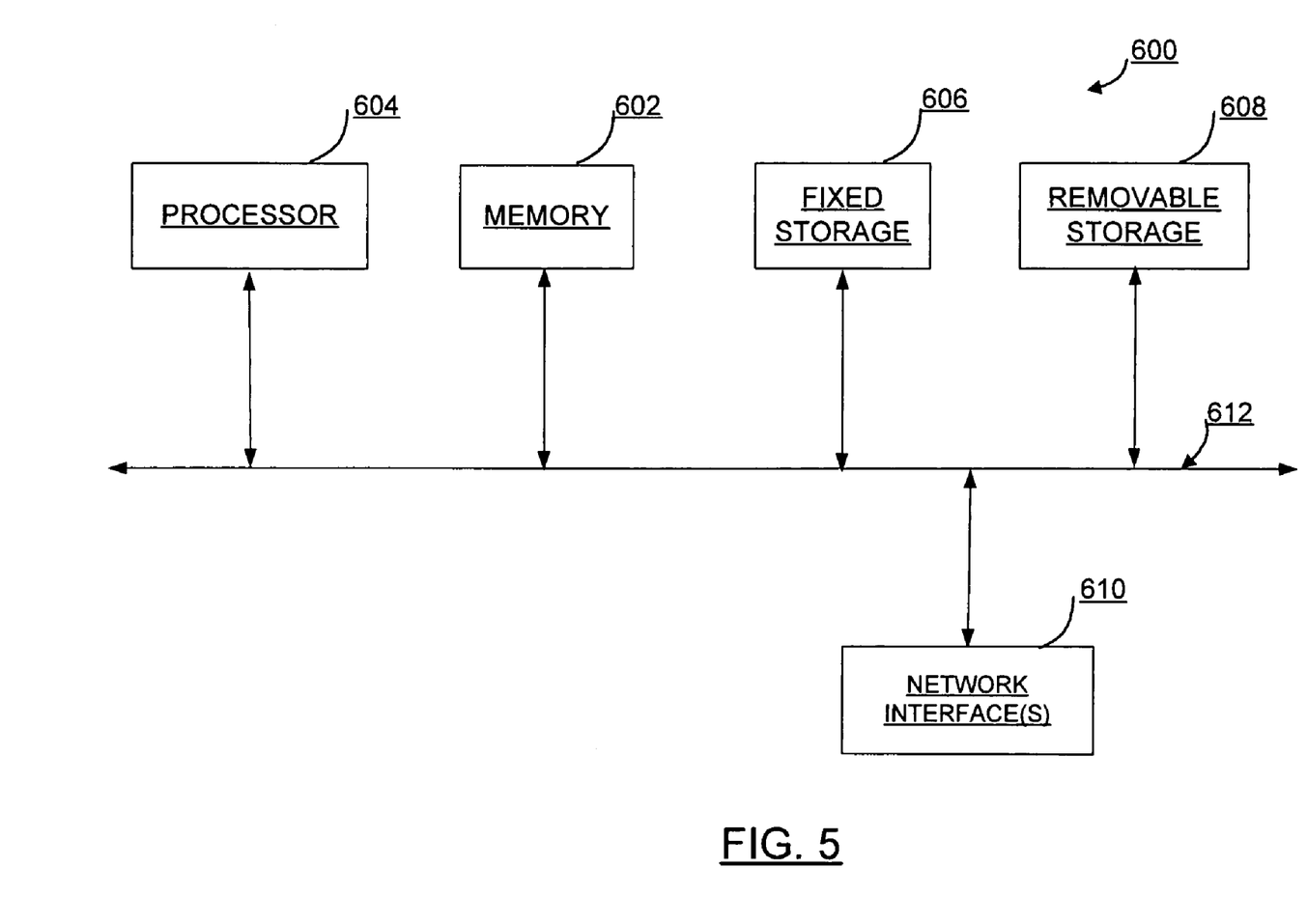
FIG. 5 is a block diagram of a data processing system useful for practicing the invention.

FIG. 5 shows a system block diagram of computer system 600 that may be used to execute software of an embodiment of the invention. The computer system 600 includes memory 602 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 600 further includes subsystems such as a central processor 604, fixed storage 606, removable storage 608, and one or more network interfaces 610. Other computer systems suitable for use with the invention may include additional or fewer subsystems.

The system bus architecture of computer system 600 is represented by arrow 612 in FIG. 5. However, these arrows are only illustrative of one possible interconnection scheme serving to link the subsystems. For example, a local bus may be utilized to connect the central processor 604 to the system memory 602. Computer system 600 shown in FIG. 5 is only one example of a computer system suitable for use with the invention. Other computer architectures having different configurations of subsystems may also be utilized. Communication between computers within the network is made possible with the use of communication protocols, which govern how computers exchange information over a network.

The invention has now been described with reference to the preferred embodiments. Alternatives and substitutions will now be apparent to persons of skill in the art. Accordingly, it is not intended to limit the invention except as provided by the appended claims.

What is claimed is:

1. A system for scheduling packets from different flows for transmission via a channel, said system comprising:
   a data processor;
   a computer readable medium for storing computer program code which, when executed by the processor, builds a data structure, stored in memory, for holding information utilized to implement scheduling of packets, said data structure including information resident in a data base, used by said computer program code, including:
   a plurality of node objects stored in the memory;
   pointer information, associated with each node, determining parent, child, and sibling relationships to form a tree structure with multiple levels, with all nodes in a level being siblings, with a root level having one node that has at least two direct descendents, with internal nodes having at least m/2 descendents, and with leaf nodes having no descendents;
   priority information in the form of eligibility keys held in each node object, where each node object must hold at least m/2 eligibility keys but not more than m eligibility keys where m is an integer, where the eligibility keys held in each node object are sorted and a best eligibility key is copied to the node's parent node; and
   node open information indicating an open node at each level, where an open leaf node is the only node that can accept a new key.

2. The system of claim 1 further comprising:
   linking information linking leaf nodes to indicate merge/balance partners among leaf nodes.

3. A method, performed by executing computer program code on a data processing system, for inserting or deleting a new eligibility key in a data structure stored in memory, with the data structure including a plurality of node objects stored in the memory, pointer information, associated with each node, determining parent, child, and sibling relationships to form a tree structure with multiple levels, with all nodes in a level being siblings, with a root level having one node that has at least two direct descendents, with internal nodes having at least m/2 descendents, and with leaf nodes having no descendents, priority information in the form of eligibility keys held in each node object, where each node object must hold at least m/2 eligibility keys but not more than m eligibility keys where m is an integer, where the eligibility keys held in each node object are sorted and a best eligibility key is copied to the node's parent node, and node open information indicating an open node at each level, where an open leaf node is the only node that can accept a new key, said method comprising:
   inserting a new eligibility key in an open leaf node;
   allocating a new leaf node;
   assigning m/2 of the eligibility keys held in the open leaf node to the new leaf node; and
   attaching the new leaf node to the open leaf node at a first parent level.

4. The method of claim 3 further comprising:
   sorting the eligibility keys stored in the new leaf node and the open leaf node and copying the most eligible eligibility key from each node to a parent node at the first parent level having both the new leaf node and open leaf node as descendents.

5. The method of claim 4 further comprising:

allocating a new parent level node at the first parent level if the parent node at the first parent level, having both the new leaf node and open leaf node as descendents, has its number of direct descendent nodes increased to m;

assigning m/2 of the eligibility keys held in the parent node to the new parent level node; and attaching the new first parent level node and parent node at a second parent level.

6. The method of claim 3 further comprising:

allocating a new node if an open node in a particular level has its number of descendents increased to m as a result of inserting an eligibility key;

assigning m/2 of the eligibility keys held in the open node to the new node; and attaching the new node to the open node at a next highest level to the particular level.

7. The method of claim 6 further comprising:

creating a link between the open node and the new node when the new node is allocated to form a linked list of nodes in a sibling group.

8. The method of claim 3 further comprising:

allocating a new node if the root node has its number of direct descendents increased to m as a result of inserting an eligibility key;

assigning m/2 of the eligibility keys held in the root node to the new node; and attaching the root node and the new node to a new root node to increase the depth of the data structure.

9. The method of claim 3 further comprising:

sorting eligibility keys stored in the root node to determine the most eligible key stored in the data structure.

10. The method of claim 3 further comprising:

merging a first node, having its number of direct descendents decreased below m due to the removal of an eligibility key, with a neighboring node;

holding keys from both the first node and the neighboring node in the first node; and de-allocating storage for the neighboring node.

11. The method of claim 10 further comprising:

fetching only nodes needing to be merged or balanced when key from the root node is deleted.

12. The method of claim 10 further comprising:

removing the root node if the root node has only one descendent as a result of merging nodes in the level below the root node; and promoting a node resulting from the merging nodes to the root node to decrease the depth of the data structure.

13. A system for inserting or deleting a new eligibility key in a data structure stored in memory, with the data structure including a plurality of node objects stored in the memory, pointer information, associated with each node, determining parent, child, and sibling relationships to form a tree structure with multiple levels, with all nodes in a level being siblings, with a root level having one node that has at least two direct descendents, with internal nodes having at least m/2 descendents, and with leaf nodes having no descendents, priority information in the form of eligibility keys held in each node object, where each node object must hold at least m/2 eligibility keys but not more than m eligibility keys where m is an integer, where the eligibility keys held in each node object are sorted and a best eligibility key is copied to the node's parent node, and node open information indicating an open node at each level, where an open leaf node is the only node that can accept a new key, said system comprising:

means for inserting a new eligibility key in an open leaf node;

means for allocating a new leaf node;

means for assigning m/2 of the eligibility keys held in the open leaf node to the new leaf node; and means for attaching the new leaf node to the open leaf node at a first parent level.

14. The system of claim 13 further comprising:

means for sorting the eligibility keys stored in the new leaf node and the open leaf node and copying the most eligible eligibility key from each node to a parent node at the first parent level having both the new leaf node and open leaf node as descendents.

15. The system of claim 14 further comprising:

means for allocating a new parent level node at the first parent level if the parent node at the first parent level, having both the new leaf node and open leaf node as descendents, has its number of direct descendent nodes increased to m;

means for assigning m/2 of the eligibility keys held in the parent node to the new parent level node; and means for attaching the new first parent level node and parent node at a second parent level.

16. The system of claim 13 further comprising:

means for allocating a new node if an open node in a particular level has its number of descendents increased to m as a result of inserting an eligibility key;

means for assigning m/2 of the eligibility keys held in the open node to the new node; and means for attaching the new node to the open node at a next highest level to the particular level.

17. The system of claim 16 further comprising:

means for creating a link between the open node and the new node when the new node is allocated to form a linked list of nodes in a sibling group.

18. The system of claim 13 further comprising:

means for allocating a new node if the root node has its number of direct descendents increased to m as a result of inserting an eligibility key;

means for assigning m/2 of the eligibility keys held in the root node to the new node; and means for attaching the root node and the new node to a new root node to increase the depth of the data structure.

19. The system of claim 13 further comprising:

means for sorting eligibility keys stored in the root node to determine the most eligible key stored in the data structure.

20. The system of claim 13 further comprising:

means for merging a first node, having its number of direct descendents decreased below m due to the removal of an eligibility key, with a neighboring node;

means for holding keys from both the first node and the neighboring node in the first node; and means for de-allocating storage for the neighboring node.

21. The system of claim 20 further comprising:

means for fetching only nodes needing to be merged or balanced when key from the root node is deleted.

22. The system of claim 20 further comprising:

means for removing the root node if the root node has only one descendent as a result of merging nodes in the level below the root node; and means for promoting a node resulting from the merging nodes to the root node to decrease the depth of the data structure.

23. A computer program product, executed on a data processing system, for inserting or deleting a new eligibility key in a data structure stored in memory, with the data structure including a plurality of node objects stored in the memory, pointer information, associated with each node, determining parent, child, and sibling relationships to form a tree structure with multiple levels, with all nodes in a level being siblings, with a root level having one node that has at least two direct descendents, with internal nodes having at least m/2 descendents, and with leaf nodes having no descendents, priority information in the form of eligibility keys held in each node object, where each node object must hold at least m/2 eligibility keys but not more than m eligibility keys where m is an integer, where the eligibility keys held in each node object are sorted and a best eligibility key is copied to the node's parent node, and node open information indicating an open node at each level, where an open leaf node is the only node that can accept a new key, said computer program product comprising:

a computer usable medium having computer readable program code physically embodied therein, said computer program product further comprising:

computer readable program code executed by the data processing system for inserting a new eligibility key in an open leaf node;

computer readable program code executed by the data processing system for allocating a new leaf node;

computer readable program code executed by the data processing system for assigning m/2 of the eligibility keys held in the open leaf node to the new leaf node; and computer readable program code executed by the data processing system for attaching the new leaf node to the open leaf node at a first parent level.

24. The computer program product of claim 23 further comprising:

computer readable program code executed by the data processing system for sorting the eligibility keys stored in the new leaf node and the open leaf node and copying the most eligible eligibility key from each node to a parent node at the first parent level having both the new leaf node and open leaf node as descendents.

25. The computer program product of claim 24 further comprising:

computer readable program code executed by the data processing system for allocating a new parent level node at the first parent level if the parent node at the first parent level, having both the new leaf node and open leaf node as descendents, has its number of direct descendent nodes increased to m;

computer readable program code executed by the data processing system for assigning m/2 of the eligibility keys held in the parent node to the new parent level node; and computer readable program code executed by the data processing system for attaching the new first parent level node and parent node at a second parent level.

26. The computer program product of claim 23 further comprising:

computer readable program code executed by the data processing system for allocating a new node if an open node in a particular level has its number of descendents increased to m as a result of inserting an eligibility key;

computer readable program code executed by the data processing system for assigning m/2 of the eligibility keys held in the open node to the new node; and computer readable program code executed by the data processing system for attaching the new node to the open node at a next highest level to the particular level.

27. The computer program product of claim 26 further comprising:

computer readable program code executed by the data processing system for creating a link between the open node and the new node when the new node is allocated to form a linked list of nodes in a sibling group.

28. The computer program product of claim 27 further comprising:

computer readable program code executed by the data processing system for allocating a new node if the root node has its number of direct descendents increased to m as a result of inserting an eligibility key;

computer readable program code executed by the data processing system for assigning m/2 of the eligibility keys held in the root node to the new node; and computer readable program code executed by the data processing system for attaching the root node and the new node to a new root node to increase the depth of the data structure.

29. The computer program product of claim 23 further comprising:

computer readable program code executed by the data processing system sorting eligibility keys stored in the root node to determine the most eligible key stored in the data structure.

30. The computer program product of claim 23 further comprising:

computer readable program code executed by the data processing system merging a first node, having its number of direct descendents decreased below m due to the removal of an eligibility key, with a neighboring node;

computer readable program code executed by the data processing system holding keys from both the first node and the neighboring node in the first node; and computer readable program code executed by the data processing system de-allocating storage for the neighboring node.

31. The method of claim 30 further comprising:

computer readable program code executed by the data processing system for fetching only nodes needing to be merged or balanced when key from the root node is deleted.

32. The computer program product of claim 30 further comprising:

computer readable program code executed by the data processing system removing the root node if the root node has only one descendent as a result of merging nodes in the level below the root node; and computer readable program code executed by the data processing system promoting a node resulting from the merging nodes to the root node to decrease the depth of the data structure.

* * * * *